US012351439B2

(12) United States Patent
Phizacklea

(10) Patent No.: US 12,351,439 B2
(45) Date of Patent: Jul. 8, 2025

(54) ALIGNMENT SYSTEM

(71) Applicant: BAE SYSTEMS plc, London (GB)

(72) Inventor: Alan Phizacklea, Barrow-in-Furness (GB)

(73) Assignee: BAE SYSTEMS PLC, London (GB)

( * ) Notice: Subject to any disclaimer, the term of this patent is extended or adjusted under 35 U.S.C. 154(b) by 449 days.

(21) Appl. No.: 17/999,774

(22) PCT Filed: May 20, 2021

(86) PCT No.: PCT/GB2021/051217
§ 371 (c)(1),
(2) Date: Nov. 23, 2022

(87) PCT Pub. No.: WO2021/240134
PCT Pub. Date: Dec. 2, 2021

(65) Prior Publication Data
US 2023/0242385 A1  Aug. 3, 2023

(30) Foreign Application Priority Data

May 27, 2020  (GB) ..................................... 2007879

(51) Int. Cl.
*B66F 7/28*       (2006.01)
*B63B 73/60*     (2020.01)
(Continued)

(52) U.S. Cl.
CPC .............. *B66F 7/10* (2013.01); *B63B 73/60* (2020.01); *B66F 7/28* (2013.01)

(58) Field of Classification Search
CPC .............. B23K 37/0452; B23K 37/047; B23K 37/0211; G03F 7/70716; Y10T 74/20354;
(Continued)

(56) References Cited

U.S. PATENT DOCUMENTS 11,466,809 B2 * 10/2022 Kobel ..................... F16M 11/22
2004/0177520 A1 * 9/2004 Nakamura .......... G03F 7/70058
33/1 M
(Continued)

FOREIGN PATENT DOCUMENTS

CN    101456452 A  *  6/2009
CN    102001451 A  *  4/2011
(Continued)

OTHER PUBLICATIONS

International Search Report and Written Opinion received for PCT/GB2021/051217. Mail date: Aug. 11, 2021. 10 pages.

*Primary Examiner* — Mahdi H Nejad
(74) *Attorney, Agent, or Firm* — Finch & Maloney PLLC

(57) ABSTRACT

An alignment jig (10) configured to support and orient a load (500). The alignment jig (10) may form part of an alignment system (300). The alignment jig (10) comprises a first base unit (100) configured to carry a first support unit (200), the first support unit (200) being configured to support the load (500) and to space the first base unit (100) apart from the load (500). The first support unit (200) is moveable relative to the first base unit (100). The first base unit (100) comprises a first base unit actuation system (110) operable to act on the first support unit (200) along a first base unit operational axis X1. The first support unit (200) comprises a first support unit actuation system (210) operable to act on the load (500) along a first support unit operational axis Y1.

20 Claims, 10 Drawing Sheets

(51) Int. Cl.
*B64F 5/00* (2017.01)
*B66F 7/10* (2006.01)

(58) Field of Classification Search
CPC ... B23Q 1/621; B64F 5/10; B66F 7/10; B66F 7/28; B63B 73/60
USPC ....... 254/84; 74/490.09, 490.13; 310/120.06; 901/16
See application file for complete search history.

(56) References Cited

U.S. PATENT DOCUMENTS

| | | |
|---|---|---|
| 2010/0084800 A1 | 4/2010 | Uhal et al. |
| 2014/0033854 A1* | 2/2014 | Hosaka ............... G03F 7/70758 74/490.09 |
| 2016/0009421 A1* | 1/2016 | Oberoi .............. B29C 45/14336 29/559 |

FOREIGN PATENT DOCUMENTS

| | | | |
|---|---|---|---|
| CN | 204037919 U | * | 12/2014 |
| CN | 105644807 A | | 6/2016 |
| CN | 105729449 A | * | 7/2016 |
| CN | 106994578 A | | 8/2017 |
| CN | 107081551 A | | 8/2017 |
| CN | 117902016 A | * | 4/2024 |
| CN | 118664217 A | * | 9/2024 |
| DE | 102013114532 A1 | | 6/2015 |
| EP | 3395692 A1 | | 10/2018 |
| WO | 2021240134 A1 | | 12/2021 |

\* cited by examiner

ALIGNMENT SYSTEM

The present disclosure relates to an alignment jig.

In particular the disclosure is concerned with an alignment jig that may form part of an alignment system.

BACKGROUND

In heavy engineering applications it is often required to assemble a structure from a number of large and very heavy units. The different units must be brought together and oriented correctly relative to one another so that joining of the units can be done to a high degree of accuracy. For example if a joining process is required then a pair of units must be brought together and angled relative to one another in order to allow the joining process to be executed as required.

Generally the alignment is done using some form of jig and/or crane arrangement with the crane being used to locate the units in the correct position, and a jig being provided underneath the article, with the unit being packed up in order to get it into the correct final orientation. For extremely large structures, for example parts of ships and submarines, conventional cranes of sufficient capacity may not be available in the environment in which the support is required. Hence it is common to use ad-hoc jig arrangements to move the units together and into the correct orientation.

An example of apparatus and method of aligning these units is illustrated with reference to FIG. 1. Temporary fixtures 1 are welded onto units 2, which act as locations to seat the units 2 onto jigs 4. A specialised rail system may be installed in the location where the units 2 are to be aligned. The units 2 are brought together along the rails and alignment relies on manual jacking and hydraulic pulling of the units 2 relative to the jigs 4.

The ad-hoc nature of these arrangements can mean that it can take considerable time to get the parts of the structure in place, and take a considerable number of people. Not only is the process potentially hazardous for the people involved, the end result and amount of control achieved may not result in an adequate alignment, which can have a detrimental effect on the final structure or increase the need for rework.

An alignment apparatus which can carry and orient a unit reliably, safely and quickly is highly desirable. Likewise an alignment apparatus that can be installed on an existing substrate/floor without modification to the substrate/floor is also highly desirable, as this allows more flexibility in an assembly process and reduce manufacturing costs.

SUMMARY

According to the present disclosure there is provided an alignment system as set forth in the appended claims. Other features of the invention will be apparent from the dependent claims, and the description which follows.

Accordingly there may be provided An alignment system (300) comprising an alignment jig (10) configured to support and orient a load (500), the alignment jig comprising:
 a first base unit (100) configured to carry a first support unit (200), the first support unit (200) being configured to support the load (500) and to space the first base unit (100) apart from the load (500); and the first support unit (200) being moveable relative to the first base unit (100),
 the first base unit (100) comprising a first base unit actuation system (110) operable to act on the first support unit (200) along a first base unit operational axis X1; and
 the first support unit (200) comprising a first support unit actuation system (210) operable to act on the load (500) along a first support unit operational axis Y1;
 wherein the base unit actuation system (110) comprises a first actuator unit (120) spaced apart from a second actuator unit (122) along the base unit operational axis X1, and the first actuator unit (120) is fixed relative to the second actuator unit (122) by a base unit support structure (130);
 wherein the support unit actuation system (210) comprises a third actuator unit (220) spaced apart from a fourth actuator unit (222) along the base unit operational axis X1, and the third actuator unit (220) is fixed relative to the fourth actuator unit (222) by a support unit support structure (230); and
 the alignment system (300) further comprising:
 a support track system (400) configured to support the alignment jig (10), wherein the alignment jig (10) is moveable relative to the support track (400); the support track system (400) comprises two track members (402A, 402B) spaced apart from one another by a distance D, wherein the base unit (100, 1100) spans the track members (402A, 402B); each track member (402A, 402B) is provided with a track actuation unit (410A, 410B) operable to move the alignment jig (10) relative to the tracks (402A, 402B);
 a spacer member (430A1, 430A2, 430B1, 430B2) is provided between each track member (402A, 402B) and the alignment jig (10), the spacer member (430A, 430B) being configured to allow relative movement between the alignment jig (10) and the respective track member (402A, 402B).

The alignment jig (10) my further comprise a second base unit (1100) configured to carry a second support unit (1200), the second support unit (1200) being configured to support the load (500) and to space the second base unit (1100) apart from the load (500). The second support unit (1200) may be moveable relative to the second base unit (1100). The second base unit (1100) may comprise a second base unit actuation system (1110) operable to act on the second support unit (1200) along a second base unit operational axis X2. The second support unit (1200) may comprise a second support unit actuation system (1210) operable to act on the load (500) along a second support unit operational axis Y2.

The first support unit actuation system (210) may be operable independently of the second support unit actuation system (1210), and the first base unit actuation system (110) may be operable independently of the second base unit actuation system (1110).

The or each base unit actuation system (110, 1110) may comprise a first actuator unit (120, 1120) spaced apart from a second actuator unit (122, 1122) along the respective base unit operational axis X1, X2.

Each first actuator unit (120, 1120) may be fixed relative to its respective second actuator unit (122, 1122) by a base unit support structure (130).

The first base unit (100) may be spaced apart from the second base unit (1100) along an operational axis Z1, where the operational axis Z1 is substantially perpendicular to the operational axes X1, X2 and to the operational axes Y1, Y2.

The first base unit (100) may be fixed relative to the second base unit (1100) by the base unit support structure (130).

The or each support unit actuation system (210, 1210) may comprise a third actuator unit (220, 1220) spaced apart from a fourth actuator unit (222, 1222) along the respective base unit operational axes X1, X2.

Each third actuator unit (220, 1220) may be fixed relative to the fourth actuator unit (222, 1222) by a respective support unit support structure (230, 1230).

Each third actuator unit (220, 1220) may comprise a pair of actuators (224A, 224B; 1224A, 1224B) which are spaced apart from one another along the operational axis Z1. Each fourth actuator unit (222, 1222) may comprise a pair of actuators (226A, 226B; 1226A, 1226B) which are spaced apart from one another along the operational axis Z1.

Each actuator of the actuator units may be operable independently of the other actuators.

The or each support unit support structure (230, 1230) may comprise a first member (232A, 1232A) which extends between one of the actuators (224A, 1224A) of the pair of actuators of the third actuator unit (220, 1220), and one of actuators (226A, 1226A) of the pair of actuators of the fourth actuator unit (222, 1222). The or each support unit support structure (230, 1230) may comprise a second member (232B, 1232B) which extends between the other actuator (224B, 1224B) of the pair of actuators of the third actuator unit (220, 1220), and the other actuator (226B, 1226B) of the pair of actuators of the fourth actuator unit (222, 1222). The first member (232A, 1232A) and second member (232B, 1232B) may be spaced apart from one another along the operational axis Z1, and attached to one another at least at one point along their length such that they may move relative to one another.

There may also be provided an alignment system (300) comprising: an alignment jig (10) of the present disclosure; and a support track system (400) configured to support the alignment jig (10); wherein the alignment jig (10) is moveable relative to the support track (400).

The support track system (400) may comprises two track members (402A, 402B) spaced apart from one another by a distance D, wherein the or each base unit (100, 1100) span the track members (402A, 402B).

Each track member (402A, 402B) may be provided with a track actuation unit (410A, 410B) operable to move the alignment jig (10) relative to the tracks (402A, 402B).

A spacer member (430A1, 430A2, 430B1, 430B2) may be provided between each track member (402A, 402B) and the alignment jig (10), the spacer member (430A, 430B) being configured to allow relative movement between the alignment jig (10) and the respective track member (402A, 402B).

Thus there may be provided an alignment jig, and an alignment system comprising an alignment jig according to the present disclosure. There may also be provided a method of controlling and/or operating an alignment jig and/or alignment system according to the present disclosure. Thus there is provided a reliable, safe and repeatable apparatus and method for the alignment and orientation of large fabrication unit loads relative to one another.

BRIEF DESCRIPTION OF THE DRAWINGS

Examples of the present disclosure will now be described with reference to the accompanying drawings, in which.

DETAILED DESCRIPTION

Figure 1:
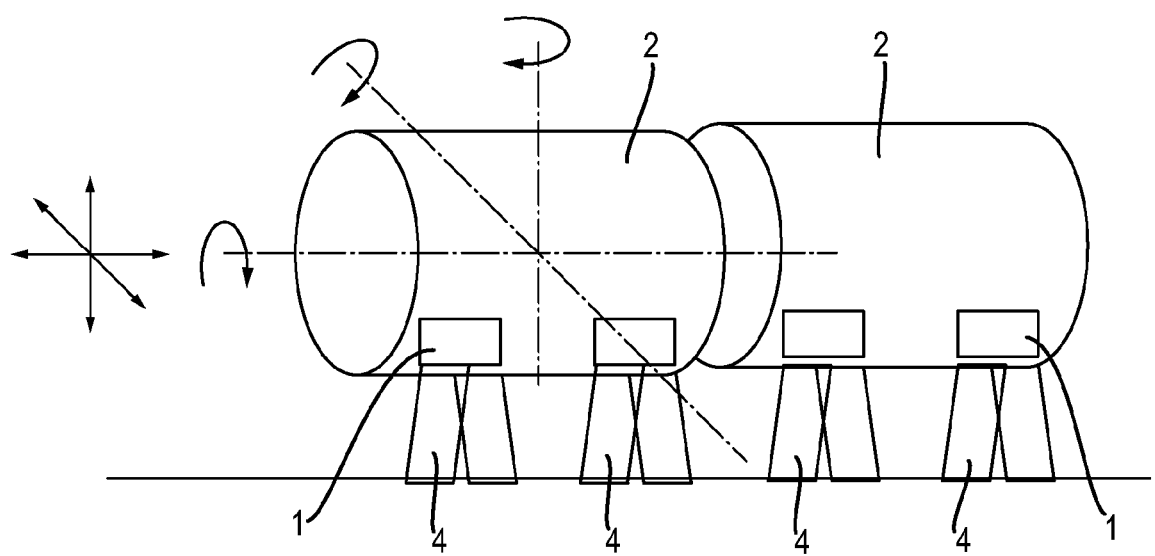
FIG. 1 is a schematic representation of an example apparatus for the alignment of large units according to the art.

The present disclosure relates to an alignment jig 10, an alignment system 300 comprising an alignment jig 10 according to the present disclosure and a method of operating and/or controlling an alignment system including an alignment jig of the present disclosure. The alignment system may include a control system configured to orchestrate operation of the jig and/or system as a whole.

FIGS. 2 to 6 show detail of features of the alignment jig 10 and alignment system 300. FIGS. 7 to 18 illustrate different modes of operation of the alignment jig 10 and alignment system 300.

A load 500 (for example a unit) is carried by the alignment jig 10. In the examples shown the load 500 comprises an interface platform 504 upon which a further structure/unit 502 is carried. Hence the interface platform 504 may be configured to seat the structure/unit 502, and the interface platform 504 is also configured to interface with the jig 10. Hence the interface platform 504 may be bespoke to the structure 502. Hence, different structures 502 may carried by the alignment jig 10 using a variety of different interface platforms 504. The interface platform 504 may be relatively inexpensive relative to the alignment jig 10 and system 300, and hence different interface platforms 504 allow the alignment jig 10 to be used with a large variety of structures, and hence a large range of applications. The interface platform 504 may comprise a single element, or be made up from a number of sub-elements or layers.

In alternative examples, the alignment jig 10 may interface directly with the structure 502.

Figure 2:
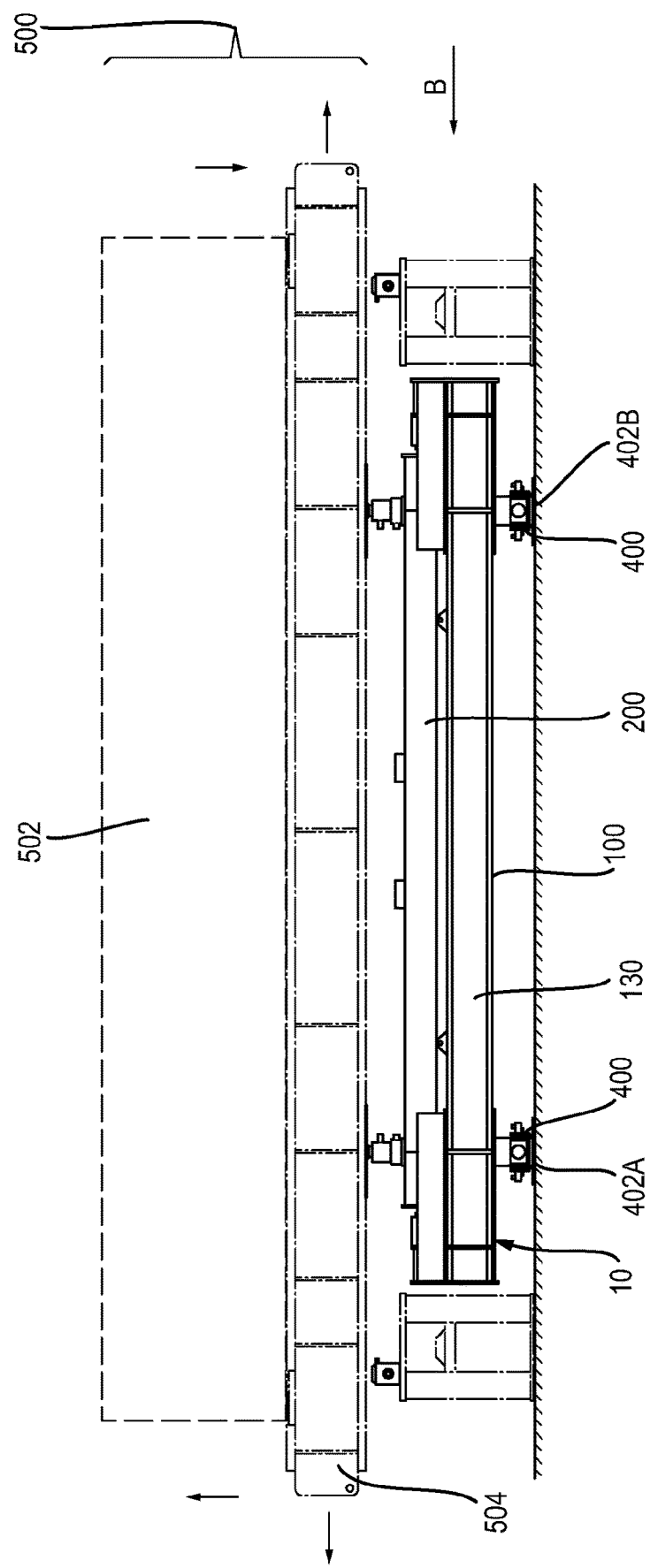
FIG. 2 shows an end elevation of an alignment system according to the present disclosure.
Figure 3:
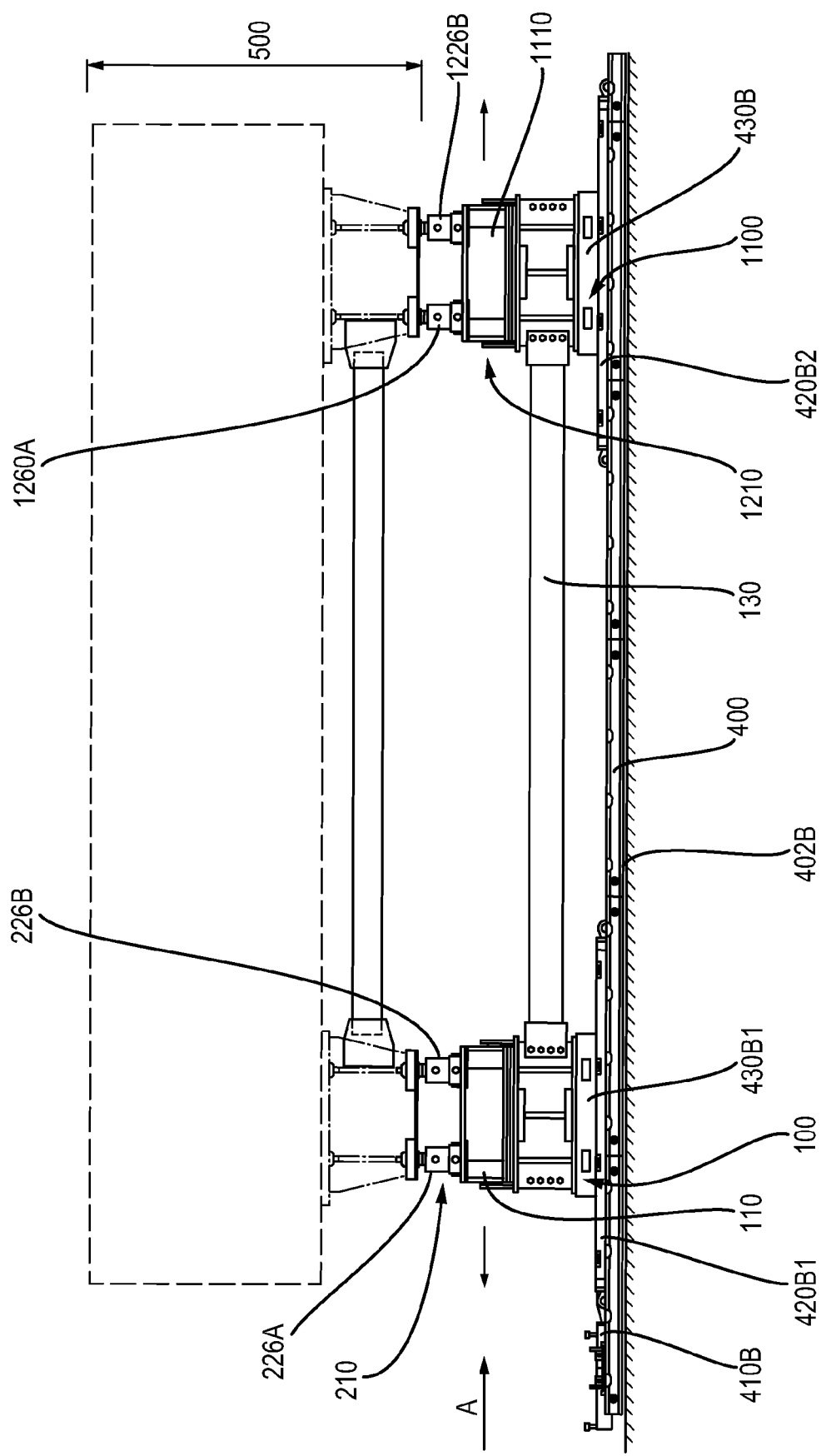
FIG. 3 shows a side elevation of the alignment system according to the present disclosure.
Figure 4:
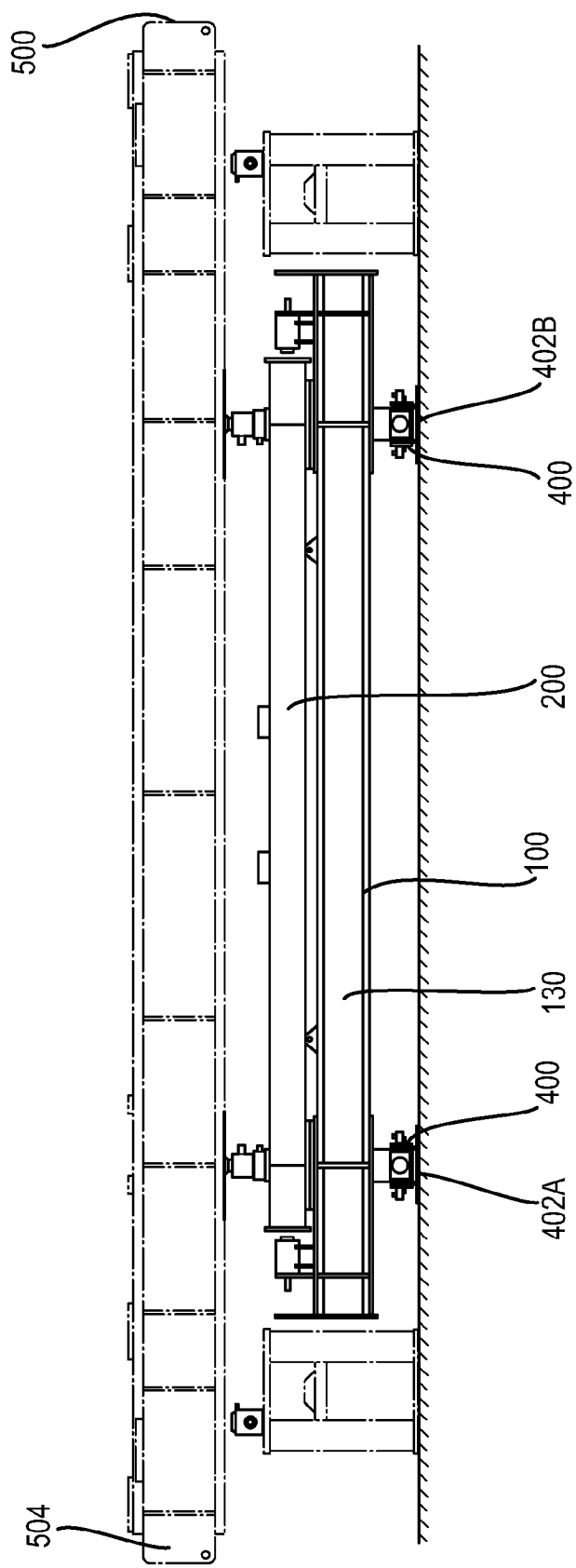
FIG. 4 shows an end elevation of the alignment system shown in FIG. 2, with some casing features removed to show further detail.
Figure 5:
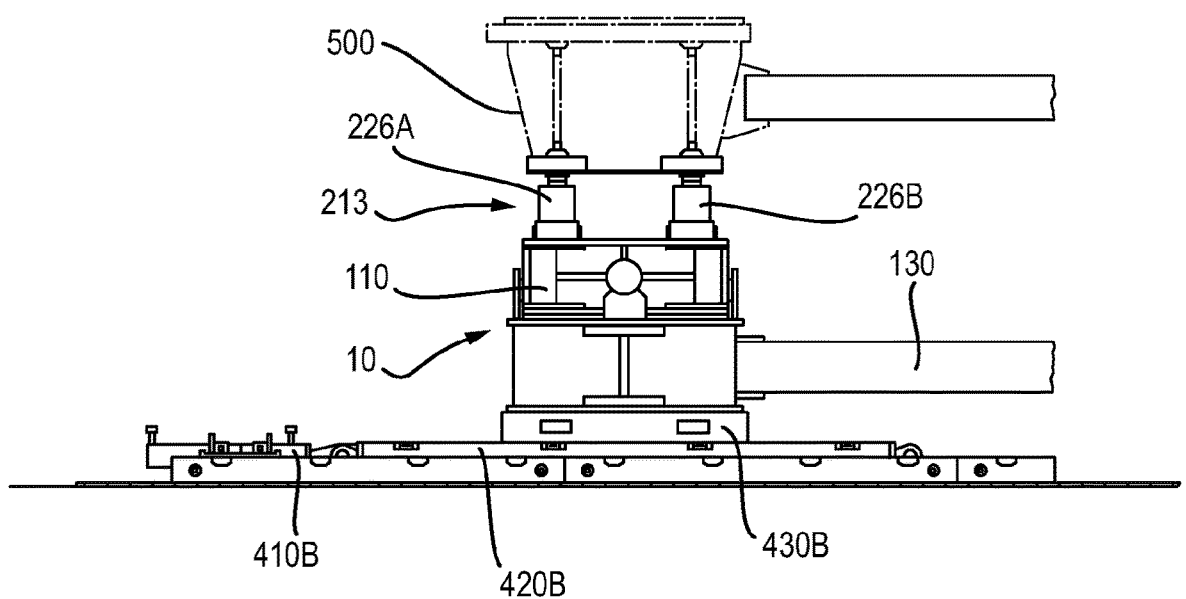
FIG. 5 shows an enlarged view of a section of the alignment system.
Figure 6:
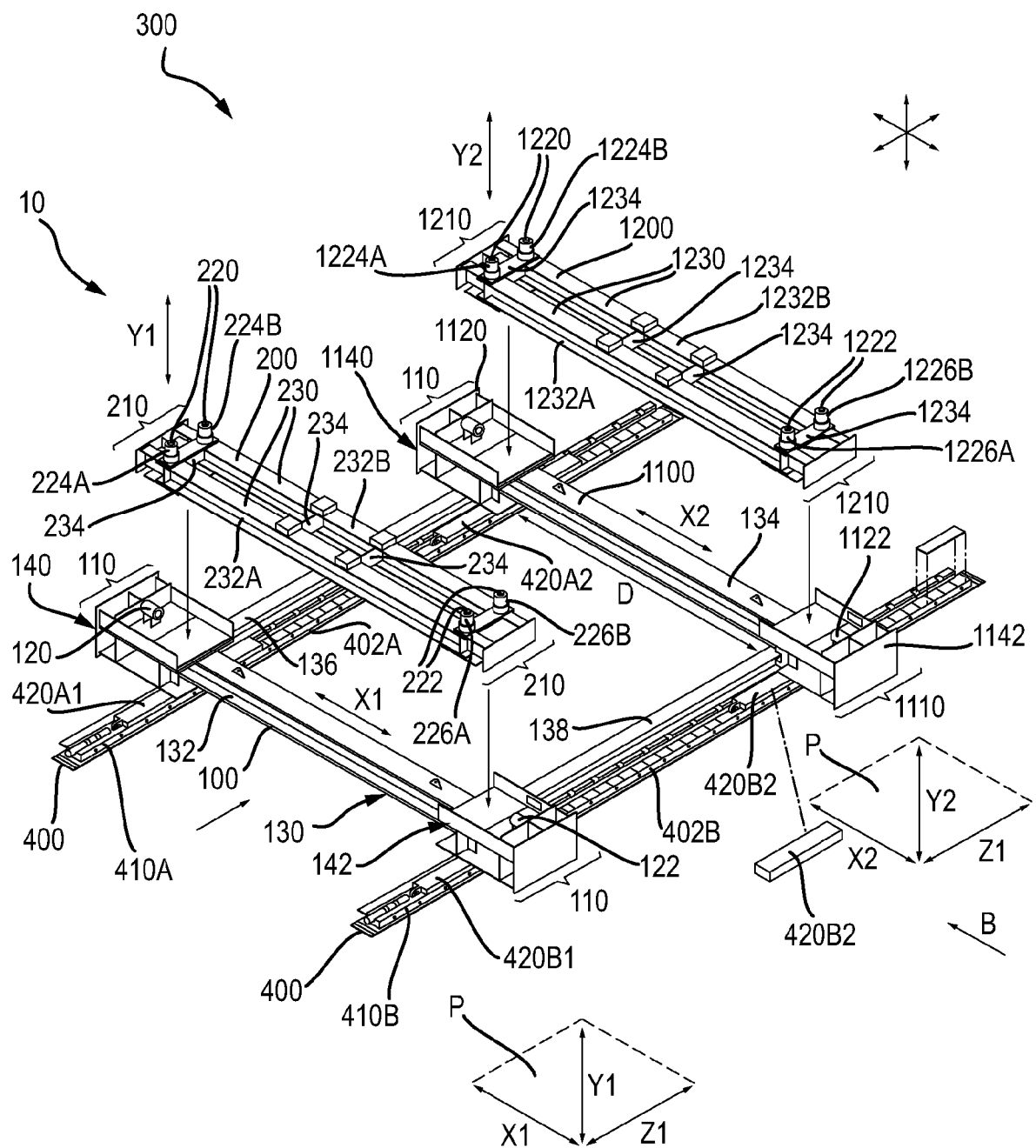
FIG. 6 shows an exploded view of the alignment system according to the present disclosure.

FIG. 3 shows a side view of the arrangement shown in FIG. 2. Hence the arrangement shown in FIG. 2 is the view in the direction of arrow A in FIG. 3, and the view in FIG. 3 is the view from the direction of arrow B in FIG. 2. FIG. 4 is the same view as FIG. 2 with certain features removed in order to reveal detail of the actuation system. FIG. 5 shows an enlarged view of a corner of part of the jig 10 and system 300. FIG. 6 shows an exploded view of the alignment system 300 with alignment jig 10.

As best shown in FIG. 6, the alignment jig 10, which is configured to support and orient the load 500, comprises a first base unit 100 configured to carry a first support unit 200. The first support unit 200 is configured to support the load 500 and to space the first base unit 100 apart from the load 500. The first support unit 200 is movable relative to the first base unit 100.

The alignment system 300 sits on a support track system 400, and the support track system 400 is supported on a substrate (for example the floor of a building, or other supporting surface). The track system 400 comprises a track member upon which the base unit sits. In the example shown the track system comprises parallel track members 402A, 402B between the base unit and substrate.

FIG. 6 illustrates a first base unit operational axis X1, a second base unit operational axis X2, a first support unit operational axis Y1, a second support unit operational axis Y2, and a track system operational axis Z1.

Operational axes X1, Y1, Z1 are at an angle to one another. In the examples shown the operational axes X1, Y1, Z1 are perpendicular to one another.

Operational axes X2, Y2, Z1 are at an angle to one another. In the examples shown the operational axes X2, Y2, Z1 are perpendicular to one another.

Operational axes X1, X2 are offset from one another. In the example shown the operational axes X1, X2 are parallel to one another.

Operational axes Y1, Y2 are offset from one another. In the example shown the operational axes Y1, Y2 are parallel to one another.

In the example shown operational axis Z1 is perpendicular to operational axes X1, X2, Y1, Y2.

The term "operational axis" with respect to the operational axes X1, X2, Y1, Y2, Z1 may be taken to mean the direction in which a force is induced/exerted or reacted against. It may also be taken to mean a path of travel along which the respective components/element/units are operable to move, with a positive displacement and/or negative displacement. The term operational axis may also be termed "actuation line", "operational line" or "displacement path". Hence the term "operational axis", "actuation line", "operational line" and "displacement path" define a direction along which a force is induced/exerts/reacted, and/or a path/route of travel, which may be in a first direction and a second direction, where the second direction is in an opposite direction to the first direction, but along the same line/path of travel. The term "operational axis", and hence operational direction, also includes paths/directions parallel to the axis indicated.

Operational axis Z1 corresponds to the direction defined by the track system 400 (i.e. the longitudinal direction defined by the track members 402A, 402B). Operational axes X1, X2 define a transverse direction between track members 402A, 402B. Operational axes Y1, Y2 define directions perpendicular to operational axes X1, X2, Z1 away from the support track system 400 (and hence away from the substrate). Hence if the track members 402A, 402B (and hence operational axis Z1), and the transverse operational axes X1, X2 are horizontal, the operational axes Y1, Y2 are vertical.

The first base unit 100 comprises a first base unit actuation system 110 operable to move the first support unit 200 along the first base unit operational axis X1 relative to the first base unit 100.

That is to say, the first base unit 100 comprises a first base unit actuation system 110 operable to act on (i.e. to deliver a force to) the first support unit 200 along the first base unit operational axis X1 to thereby move the first support unit 200 along the operational axis X1 relative to the first base unit 100.

The first support unit 200 comprises a first support unit actuation system 210 operable to move the load 500 along the first support unit operational axis Y1.

That is to say, the first support unit 200 comprises a first support unit actuation system 210 operable to act on (i.e. deliver a force to) the load 500 along the first support unit operational axis Y1 to thereby move at least part of the load 500 relative to the first support unit 200 along the operational axis Y1.

Hence the first support unit actuation system 210 is operable to move the load 500 along the operational axis Y1. Additionally, the first support unit actuation system 210 is operable to pivot the load 500 at an angle to operational axis Y1 by varying the extent to which the load is moved along the operational axis Y1 along the length of the first support unit 200.

The alignment jig 10 further comprises a second base unit 1100 configured to carry a second support unit 1200, the second support unit 1200 being configured to support the load 500 and to space the second base unit 1100 apart from the load 500. The second support unit 1200 is moveable relative to the second base unit 1100.

The second base unit 1100 comprises a second base actuation system 1110 operable to move the second support unit 1200 along the second base unit operational axis X2 relative to the second base unit 1100.

That is to say, the second base unit 1100 comprises a second base unit actuation system 1110 operable to act on (i.e. to deliver a force to) the second support unit 1200 along the second base unit operational axis X2 to thereby move the second support unit 1200 along the operational axis X2 relative to the second base unit 1100.

The second support unit 1200 comprises a second support unit actuation system 1210 operable to move the load 500 along the second support unit operational axis Y2.

That is to say, the second support unit 1200 comprises a second support unit actuation system 1210 operable to act on (i.e. deliver a force to) the load 500 along the second support unit operational axis Y2 to thereby move at least part of the load 500 relative to the second support unit 1200 along the operational axis Y2.

Hence the second support unit actuation system 1210 is operable to move the load 500 along the operational axis Y2. Additionally, the second support unit actuation system 1210 is operable to pivot the load 500 at an angle to operational axis Y2 by varying the extent to which the load is moved along the operational axis Y2 along the length of the second support unit 1200.

The first support unit actuation system 210 is operable independently of the second support unit actuation system 1210. That is to say the first support unit actuation system 210 and the second support unit actuation system 1210 are configured and controllable such that they may be operated independently of one another.

Likewise the first base unit actuation system 110 is operable independently of the second base unit actuation system 1110. That is to say the first base unit actuation system 110 and the second base unit actuation system 1110 are configured and controllable such that they may be operated independently of one another.

The first base unit actuation system 110, second base unit actuation system 1110, first support unit actuation system 210, and second support unit actuation system 1210 are configured and controllable such that they may all be operated independently of one another.

Hence one actuation system may be operated to actuate in a given direction (for example a positive direction along the respective line of travel, i.e. operational axis) with a given force, and another may be operated to actuate in the same or different direction along its respective line of travel (i.e. operational axis), with the same or different force. Additionally one actuation system may be operated to actuate in a given direction (for example a positive direction along the respective line of travel/operational axis) with a given force, and one or more of the others may not be actuated/operated at the same time.

The or each base unit actuation system 110, 1110 comprise a first actuator unit 120, 1120 spaced apart from a second actuator unit 122, 1122 along the respective base unit operational axes X1, X2. That is to say the first base unit actuation system 110 comprises a first actuator unit 120 spaced apart from a second actuator unit 122 along the first base unit operational axis X1. Also the second base unit actuation system 1110 comprises a first actuator unit 1120 spaced apart from a second actuator unit 1122 along the second base unit operational axis X2. The first actuator units 120, 1120 and second actuator units 122, 1122 of the actuation systems 110, 1110 may comprise one or more actuators.

Each first actuator unit 120, 1120 is fixed relative to its respective second actuator unit 122, 1122 by a base unit support structure 130. That is to say the first actuator unit 120 of the first base unit 100 is fixed relative to the second actuator unit 122 of the first base unit 100 by the base unit support structure 130 to which is it attached, and the first actuator unit 1120 of the second base unit 1100 is fixed relative to the second actuator unit 1122 of the second base unit 1100 by the base unit support structure 130. Put another way, the first base unit 100 and second base unit 1100 are linked together, or form an integral part of, the base unit support structure 130. In the example shown, the first actuator units 120, 1120 and second actuator units 122, 1122 are located at corners of a square/rectangular shape defined by the base unit support structure 130.

Hence the first actuator unit 120 and second actuator unit 122 of the first base unit 100 are fixed to, and spaced apart from one another, by a first beam 132 which forms one leg of the base unit support structure 130. Likewise each first actuator unit 1120 and second actuator unit 1122 of the second base unit 1100 are spaced apart by, and fixed to, a second beam 134 which forms a second leg of the base unit support structure 130. Likewise the first actuator unit 120 of the first base unit 100 and the first actuator unit 1120 of the second base unit 1100 are spaced apart by a third beam 136 of the base unit support structure 130, to which they are both attached. The second actuator unit 122 of the first base unit 100 and the second actuator unit 1122 of the second base unit 1100 are spaced apart by, and fixed to, a fourth beam 138 which forms a final leg of the base unit support structure 130.

The first base unit 100 comprises a first shoe 140 and a second shoe 142 provided at opposite ends of the first beam 132. The second base unit 1100 comprises a first shoe 1140 and a second shoe 1142 provided at opposite ends of the second beam 134.

The first shoe 140 and second shoe 142 of the first base unit 100 are configured to receive the first support unit 200, and limit the extent to which the first support unit 100 can move relative to the first base unit 100 along the first base unit operational axis X1 and operational axis Z1.

The first shoe 1140 and second shoe 1142 of the second base unit 100 are configured to receive the second support unit 1200, and limit the extent to which the second support unit 1200 can move relative to the second base unit 1100 along the second base unit operational axis X2 and operational axis Z1.

The first base unit 100 is spaced apart from the second base unit 1100 along the operational axis Z1, where the operational axis Z1 is substantially perpendicular to the operational axes X1, X2 and the operational axes Y1, Y2. Hence the first base unit 100 may be parallel to the second base unit 1100. That is to say, the beams 132, 134 which support the actuator units of the first base unit 100 and the second base unit 1100 may be substantially parallel.

Hence the first base unit 100 is fixed relative to the second base unit 1100 by the base unit support structure 130.

The/each support unit actuation system 210, 1210 comprises a third actuator unit 220, 1220 spaced apart from a fourth actuator unit 222, 1222 along their respective base unit operational axis X1, X2. That is to say, the first support unit actuation system 210 comprises a third actuator unit 220 spaced apart from a fourth actuator unit 222 along the first base unit operational axis X1. Also, the second support unit actuation system 1210 comprises a third actuator unit 1220 spaced apart from a fourth actuator unit 1222 along the second base unit operational axis X2.

Each third actuator unit 220, 1220 is fixed relative to its respective fourth actuator unit 222, 1222 by a respective support unit support structure 230, 1230. That is to say the third actuator unit 220 of the first support unit 200 is fixed relative to the fourth actuator unit 222 of the first support unit 200 by a first support unit 200 support structure 230, and spaced apart along the first base unit operational axis X1. The third actuator unit 1220 of the second support unit 1200 is fixed relative to the fourth actuator unit 1222 of the second support unit 1200 by a second support unit 1200 support structure 1230, and spaced apart along the second base unit operational axis X2.

Each third actuator unit 220, 1220 comprises a pair of actuators 224A, 224B; 1224A, 1224B which are spaced apart from one another along the operational axis Z1. Likewise each fourth actuator unit 222, 1222 comprises a pair of actuators 226A, 226B; 1226A, 1226B which are spaced apart from one another along the operational axis Z1.

That is to say, the third actuator unit 220 of the first support unit 200 comprises a first actuator 224A and a second actuator 224B which are spaced apart from one another along the operational axis Z1, and the fourth actuator unit 222 of the first support unit 200 comprises a first actuator 226A and a second actuator 226B which are spaced apart from one another along the operational axis Z1.

Likewise the third actuator unit 1220 of the second support unit 1200 comprises a first actuator 1224A and a second actuator 1224B which are spaced apart from one another along the operational axis Z1, and the fourth actuator unit 1222 of the second support unit 1200 comprises a first actuator 1226A and a second actuator 1226B which are spaced apart from one another along the operational axis Z1.

As best shown in FIG. 6, the support unit support structure 230 of the first support unit 200 comprises a first member 232A and a second member 232B. The first member 232A and second member 232B may be provided as beams, for example "I" beams, "H" beams or box section beams. The first member 232A of the first support unit 200 and the second member 232B of the first support unit 200 are spaced apart from one another along the operational axis Z1. The first member 232A of the first support unit 200 and the second member 232B of the first support unit 200 are attached/coupled/connected to one another at least at one point along their length such that they may move relative to one another. The first member 232A of the first support unit 200 and the second member 232B of the first support unit 200 are attached/coupled/connected relative to one another at least at one point along their length such that they may bend and/or deform relative to one another. The first member 232A of the first support unit 200 and the second member 232B of the first support unit 200 are attached/coupled/connected relative to one another at least at one point along their length such that they may pivot relative to one another along the first base unit operational axis X1, the first support unit operational axis Y1 and/or the operational axis Z1.

The first member 232A of the first support unit 200 and the second member 232B of the first support unit 200 may be attached/coupled/connected together by one or more joining members 234. In examples in which more than one joining members 234 are provided, they may be spaced apart from one another along the length of the first member 232A and second member 232B along the first base unit operational axis X1.

The first member 232A extends between the first actuator 224A of the third actuator unit 220 of the first support unit 200, and the first actuator 226A of the fourth actuator unit 222 of the first support unit 200. The first member 232A may extend from the first actuator 224A of the third actuator unit 220 of the first support unit 200 to the first actuator 226A of the fourth actuator unit 222 of the first support unit 200. The first actuator 224A of the third actuator unit 220 and the first actuator 226A of the fourth actuator unit 222 may be provided towards opposite ends of the first member 232A.

The second member 232B extends between the second actuator 224B of the third actuator unit 220 of the first support unit 200, and the second actuator 226B of the fourth actuator unit 222 of the first support unit 200. The second member 232B may extend from the second actuator 224B of the third actuator unit 220 of the first support unit 200 to the second actuator 226B of the fourth actuator unit 222 of the first support unit 200. The second actuator 224B of the third actuator unit 220 and the second actuator 226B of the fourth actuator unit 222 may be provided towards opposite ends of the second member 232B.

Also as shown in FIG. 6, the support unit support structure 1230 of the second support unit 1200 comprises a first member 1232A and a second member 1232B. The first member 1232A and second member 1232B may be provided as beams, for example "I" beams, "H" beams or box section beams. The first member 1232A of the second support unit 1200 and the second member 1232B of the second support unit 1200 are spaced apart from one another along the operational axis Z1. The first member 1232A of the second support unit 1200 and the second member 1232B of the second support unit 1200 are attached/coupled/connected to one another at least at one point along their length such that they may move relative to one another. The first member 1232A of the second support unit 1200 and the second member 1232B of the second support unit 1200 are attached/coupled/connected relative to one another at least at one point along their length such that they may bend and/or deform relative to one another. The first member 1232A of the second support unit 1200 and the second member 1232B of the second support unit 1200 are attached/coupled/connected relative to one another at least at one point along their length such that they may pivot relative to one another along the second base unit operational axis X2, the second support unit operational axis Y2 and/or the operational axis Z1.

The first member 1232A of the second support unit 1200 and the second member 1232B of the second support unit 1200 may be attached/coupled/connected together by one or more joining members 1234. In examples in which more than one joining members 1234 are provided, they may be spaced apart from one another along the length of the first member 1232A and second member 1232B along the second base unit operational axis X2.

The first member 1232A extends between the first actuator 1224A of the third actuator unit 1220 of the second support unit 1200, and the first actuator 1226A of the fourth actuator unit 1222 of the second support unit 1200. The first member 1232A may extend from the first actuator 1224A of the third actuator unit 1220 of the second support unit 1200 to the first actuator 1226A of the fourth actuator unit 1222 of the second support unit 1200. The first actuator 1224A of the third actuator unit 1220 and the first actuator 1226A of the fourth actuator unit 1222 may be provided towards opposite ends of the first member 1232A.

The second member 1232B extends between the second actuator 1224B of the third actuator unit 1220 of the second support unit 1200, and the second actuator 1226B of the fourth actuator unit 1222 of the second support unit 1200. The second member 1232B may extend from the second actuator 1224B of the third actuator unit 1220 of the second support unit 1200 to the second actuator 1226B of the fourth actuator unit 1222 of the second support unit 1200. The second actuator 1224B of the third actuator unit 1220 and the second actuator 1226B of the fourth actuator unit 1222 may be provided towards opposite ends of the second member 1232B.

Hence when the actuator units (and the respective actuators) of the support unit support structures 230, 1230 receive the load 500, the first member and second member are able to move/pivot relative to one another in order to conform to the shape of the load 500. This is described below with reference to FIG. 18.

As set out above, the alignment jig 10 may be deployed with a support track system 400 configured to support the alignment jig 10 to thereby form an alignment system 300. Hence in examples in which the support track system 400 is horizontal, a plane "P" is defined by operational axes X1, X2, Z1. The alignment jig 10 and the support track system 400 are configured such that the alignment jig 10 is moveable relative to the support track 400. The support track system 400 may be provided as a skid track. That is to say, the support track system 400 may be configured to allow the alignment jig to slide (i.e. skid) relative to the support track system 400. Hence the support track system 400 may be configured such that the alignment jig 10 is carried by the support track system 400, and is free to move relative to the support track system 400 in the plane "P" defined by operational axes X1, X2, Z1. For the avoidance of doubt, plane "P" as illustrated in FIG. 6 with respect to the operational axes X1, Y1, Z1 and operational axes X2, Y2, Z1. Hence the alignment jig 10 may move relative to the support track system 400 along the operational axes X1, X2, Z1, and/or at an angle to be operational axes X1, X2, Z1 in the plane "P". Thus the alignment jig 10 is also operable (i.e. configured) to rotate/pivot relative to the support track system 400 around an axis defined by, or parallel to one of operational axes Y1, Y2.

The first actuator unit 120 and second actuator unit 122 of the first base unit 100, the first actuator unit 1120 and second actuator unit 1122 of the second base unit 1100 comprise actuators.

As shown in FIGS. 2, 4, 6, 7, 9 to 13, 16, 17 the support track system 400 comprises two track members 402A, 402B spaced apart from one another by a distance D, and which extend in the plane "P". Additional track members may also be provided in addition to the two track members 402A, 402B. The track members 402A, 402B may extend in a line along the operational axis Z1.

The or each base unit 110, 1100 of the alignment 10 span the track members 402A, 402B so that the track members 402A, 402 carry the base units 110, 1100. That is to say, the base unit support structure 130 sits on and is carried by, and supported by, the track members 402A, 402B of the support track system 400. The track members 402A, 402B thus also support the load of the alignment jig 10 as a whole, and the load 500 when supported by the alignment jig 10.

The two track members 402A, 402B may be provided parallel to one another, and hence the distance D may be a constant distance between the track members 402A, 402B along their length.

The two track members 402A, 402B may be provided at an angle to one another, and hence the distance D may vary between the track members 402A, 402B along their length.

The support track system 400 is provided with a track actuation unit 410A, 4106 operable to move the alignment jig 10 relative to the tracks 402A, 402B. In the example shown in the figures, each track member 402A, 402B is provided with a track actuation unit 410A, 410B. The track actuation units 410A, 410B comprise actuators.

One or more track plates 420 may be provided between the base unit support structure 130 and each of the track members 402A, 402B. In the figures, the track plates 420 for the track member 402A are indicated as 420A1, 420A2, and the track plates 420 for the track member 402B are indicated as 420B, 420B. The track plates 420 and track members 402A, 402B are configured so that the track plates 420 are operable to slide along the track members 402A, 402B. The track members 402A, 402B may be configured as guide rails so that the track plates 420 are guided (i.e. constrained) to move along the track members 402A, 402B along the operational axis Z1, and prevented from moving at an angle to the operational axis Z1.

For example as shown in FIG. 6, a first track plate 420A1 and second track plate 420A2 may be provided between the track member 402A and the support unit 130, with each of the track plates 420A1, 420A2 being spaced apart from one another along the length of the track member 402A. Likewise a third track plate 420B1 and fourth track plate 420B2 may be provided between the track member 402B and the support unit 130, with each of the track plates 420B1, 420B2 being spaced apart from one another along the length of the track member 402B.

The first track plate 420A1 may be provided between the first shoe 140 of the first base unit 100 and the track member 402A. The second track plate 420A2 may be provided between the first shoe 1140 of the second base unit 1100 and the track member 402A. The third track plate 420B1 may be provided between the second shoe 142 of the first base unit 100 and the track member 402B. The fourth track plate 420B2 may be provided between the second shoe 1142 of the second base unit 1100 and the track member 402A.

The track actuation unit 410A may be fixed to track member 402A and positioned to act upon the first track plate 420A1. The track actuation unit 410B may be fixed to track member 402B and positioned to act upon the third track plate 420B1. Hence while a pair of track plates 420A1, 420A2; 420B1, 420B2 may be provided on each of the tracks 402A, 402B, the respective track actuation unit 410A, 410B may only act on one of the pair of track plates (for example the first track plate 420A1 and third track plate 420B1 respectively).

As shown most clearly in FIG. 5 (which is representative of each corner of the alignment system 300), a spacer member 430A1, 430A2, 430B1, 430B2 may be provided between each track plate 420A1, 420A2, 420B1, 420B2 and the base unit support structure 130. The/each spacer member 430A1, 430A2, 430B1, 430B2 is configured to allow relative movement between the alignment jig 10 and the respective track member 402A, 402B. In one example the spacer member 430A1, 430A2, 430B1, 430B2 is configured to have a lower co-efficient of friction on its surfaces than the surface of the track plate and/or base unit support structure 130 which it contacts. That is to say, the/each spacer member 430A1, 430A2, 430B1, 430B2 may be provided with low friction contact surfaces. The contact surfaces of the spacer member 430A1, 430A2, 430B1, 430B2 may comprise (e.g. may be made from) a low friction material. Additionally, or alternatively, the contact surfaces of the spacer member 430A1, 430A2, 430B1, 430B2 may be provided with a lubricant. In one example the contact surfaces of the spacer member may comprise an internally lubricated cast nylon.

In a further example the relative movement may be enabled by the coefficient of friction between the alignment jig 10 (i.e. the base unit support structure 130) and each spacer member 430A1, 430A2, 430B1, 430B2 being greater than the coefficient of friction between each spacer member 430A1, 430A2, 430B1, 430B2 and its respective track plate 420A, 420B. For example the surface of the spacer member 430A1, 430A2, 430B1, 430B2 which faces/contacts the track plate 420A, 420B may be lubricated, or coated with, or provided with, a low friction material, and the surface of the spacer member 430A1, 430A2, 430B1, 430B2 which faces/contacts the alignment jig 10 may be dry, un-lubricated and/or have no low friction coating, and/or have a greater co-efficient of friction than the contact surface which contacts the track plate 420A, 420B.

In a further example the relative movement may be enabled by the coefficient of friction between the alignment jig 10 (i.e. the base unit support structure 130) and each spacer member 430A1, 430A2, 430B1, 430B2 being less than the coefficient of friction between each spacer member 430A1, 430A2, 430B1, 430B2 and its respective track plate 420A, 420B. For example the surface of the spacer member 430A1, 430A2, 430B1, 430B2 which faces/contacts the alignment jig 10 may be lubricated, or coated with, or provided with, a low friction material, and the surface of the spacer member 430A1, 430A2, 430B1, 430B2 which faces/contacts the track plate 420A, 420B may be dry, un-lubricated and/or have no low friction coating, and/or have a greater co-efficient of friction than the contact surface which contacts the alignment jig 10.

Each of the actuator units of the alignment jig 10 and support track system 400 comprises at least one actuator. The term "actuator" is taken to mean a device that is operable for moving and controlling an object. That is to say, an actuator is a "mover". For example an actuator may be configured to receive a control signal and/or a source of power, and responds by converting the source of power to the actuator into mechanical motion and/or a force. The force may thus induce a motion of the object it is exerted against, or support the object to hold it in position.

One or more of the actuators of the alignment jig 10 and support track system 400 may be provided as jacks. One or more of the actuators of the alignment jig 10 and support track system 400 may comprise a piston, ram and/or lever which may be operable hydraulically, pneumatically or electrically to exert a force.

Hence the actuators 120, 122 of the first base unit 100 are operable to exert a force (i.e. push/pull) on the first support unit 200 along the operational axis X1. The actuator 120 is operable to exert a force on the first support unit 200 in an opposite direction to the actuator 122. Likewise, the actuators 1120, 1122 of the second base unit 1100 are operable to exert a force (i.e. push/pull) on the second support unit 1200 along the operational axis X2. The actuator 1120 is operable to exert a force on the second support unit 1200 in an opposite direction to the actuator 1122.

The actuators 224A, 224B 226A, 226B of the first support unit 200 are each operable to exert a force (i.e. push) on the load 500 along the operational axis Y1. Likewise the actuators 1224A, 1224B 1226A, 1226B of the second support unit 1200 are each operable to exert a force (i.e. push) on the load 500 along the operational axis Y2.

The actuators of the track actuation units 410A, 410B are each operable to exert a force (i.e. push, pull) on the their respective track plates 420A1, 420B1 along the operational axis Z1.

Each actuator unit is operable independently of the other actuator units. That is to say, each actuator units may be controlled independently of the other actuator units to exert a force.

Each actuator may be operable independently of the other actuators. That is to say, each actuator of each actuator unit of the alignment jig 10 may be controlled independently of each of the other alignment jig actuators by a control system. Likewise each actuator of each actuator unit of the alignment system 300 may be controlled independently of each of the other alignment system actuators. Thus the actuators may be operated to exert a force, where the force exerted by one actuator may be the same, or may be different, to the force exerted by one or more of the other actuators. The actuators of the jig 10 and track system 400 may be operated simultaneously. Additionally or alternatively, the actuators of the jig 10 and track system 400 may be operated at different times to one another. The control system may be provided which operates one actuator at a time, or operates two or more actuators at the same time.

The control system may comprise a computer configured to receive input commands and operate the actuators accordingly. Alternatively the actuators may be operated individually and/or manually.

Figure 7:
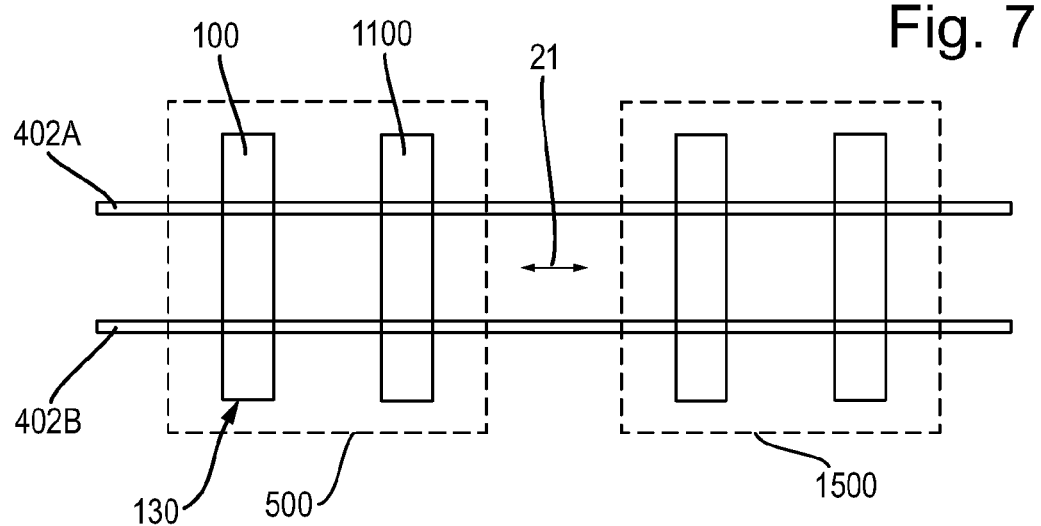
FIG. 7 is a schematic representation of the system, illustrating a first mode of operation.

FIG. 7 shows a plan view of the alignment system 300 according to the present disclosure. The track members 402A, 402B are shown extending from left to right along operational axis Z1 with a load 500 supported on the first base unit 100 and second base unit 1100. A second load 1500 is shown supported on a further alignment system which may be the same as that of the present disclosure or may be a static arrangement. Hence in operation the second load 1500 may not move on the track 400, and in some examples may not be supported on the track, but be positioned at one end of the track 400.

FIG. 7 illustrates that the alignment jig 10 may be moved backward and/or forward (i.e. left and/or right, as shown in the figure) along the track member 402A, 402B along operational axis Z1 direction under the influence of the track actuation units 410A, 410B. Hence in this example, each of the track actuation units 410A, 410B move the alignment jig 10 and load 500 along the track 400 along the operational axis Z1, for example towards and/or away from the second load 1500. This is so the first load 500 may be brought into the desired position and orientation so it may be worked upon (for example the structure of load/unit 500 being joined to the structure of load/unit 1500)

Figure 8:
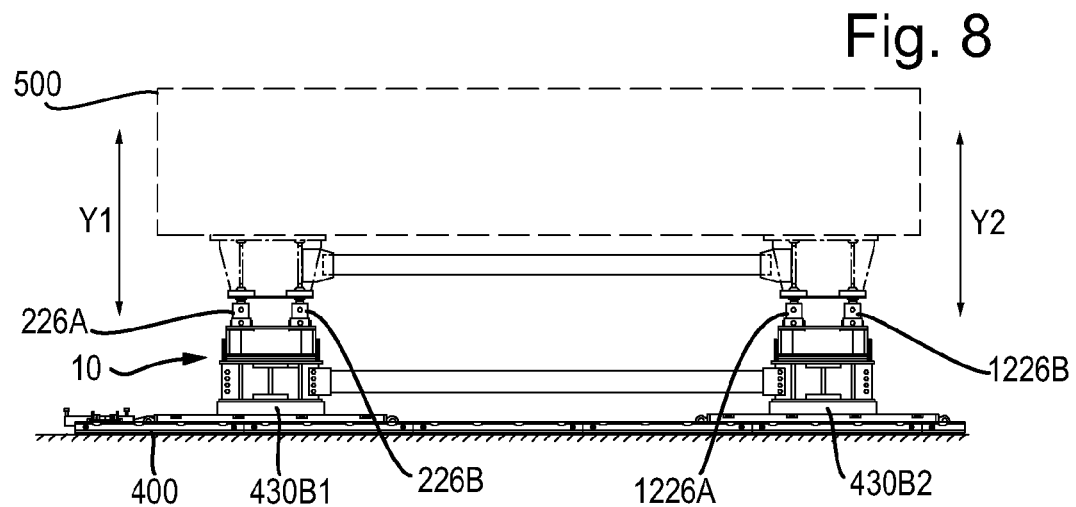
FIG. 8 shows the same view as FIG. 3, illustrating a second mode of operation.

FIG. 8, which is a side view viewed from the direction of arrow B in FIG. 2, illustrates that actuators of the third actuation unit 220 and fourth actuator unit 222 of the first support unit 200 may be utilised to raise and/or lower the load 500 relative to the first base unit 100. Likewise the actuators of the third actuation unit 1220 and fourth actuator unit 1222 of the second support unit 1200 may be utilised to raise/lower the load 500 relative to the second base unit 1100. Put another way, FIG. 8 illustrates that the third actuator units 220, 1220 and the fourth actuator units 222, 1222 are operable to lift and/or lower the load 500 with respect to the substrate (i.e. in the direction of the Y1, Y2 axes) upon which the track system 400 sits.

In the mode of operation shown in FIG. 8 the actuators of the third actuator units 220, 1220 and the fourth actuator units 222, 1222 operate to move the load 500 along the first support unit operational axis Y1 and the second support unit operational axis Y2 by an equal amount.

Figure 9:
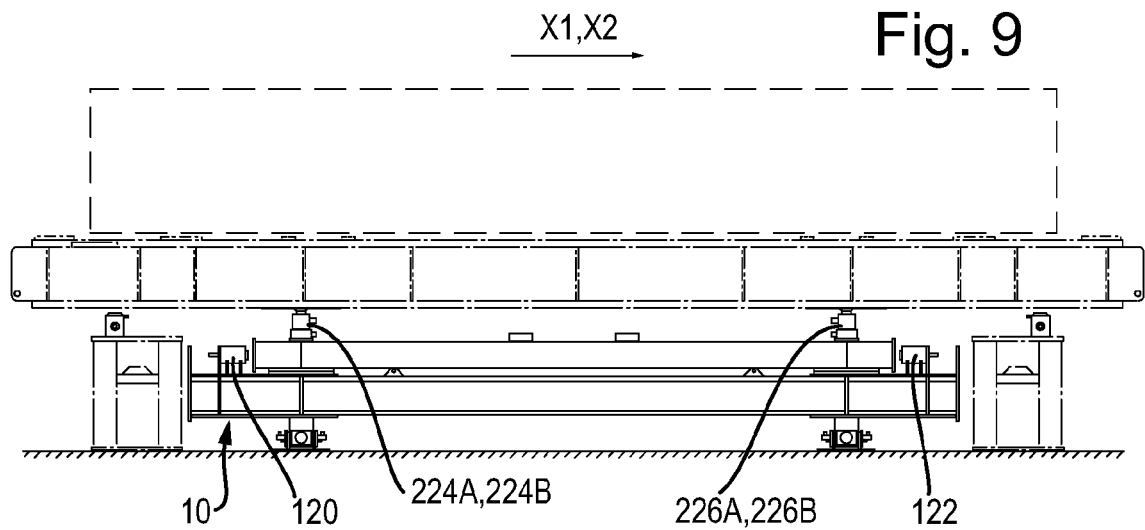
FIGS. 9, 10 shows the same view as FIG. 4 illustrating a third mode of operation.
Figure 10:
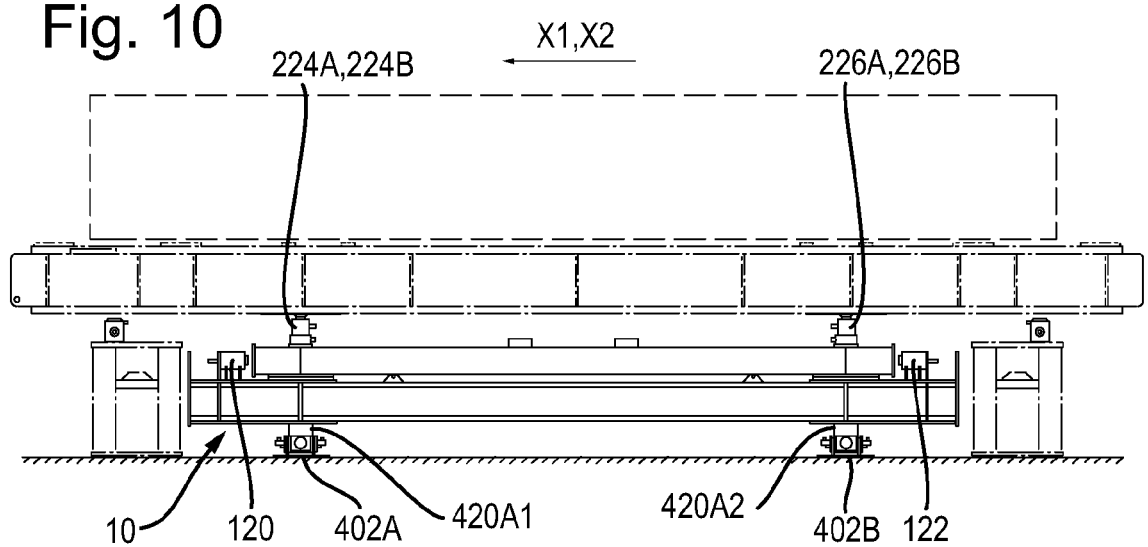

FIGS. 9, 10 illustrate examples in which the actuators of the first actuator units 120, 1120 and actuators of the second actuator units 122, 1122 operate to move the load 500 along the respective base unit operational axes X1, X2 in a first direction (left to right, as shown in FIG. 9) and a second direction (right to left, as shown in FIG. 10). Hence in FIG. 9 the actuators are shown moving the load 500 evenly in both operational axes X1, X2 towards one side of the track 400, and in FIG. 10 shown to move the load 500 in an opposite direction to that shown in FIG. 9. Thus the actuators of the first actuator unit 120, 1120 and the actuators of the second actuator unit 122, 1122 may move the load 500 in the transverse direction along operational axes X1, X2 to either side of the track 400.

Figure 11:
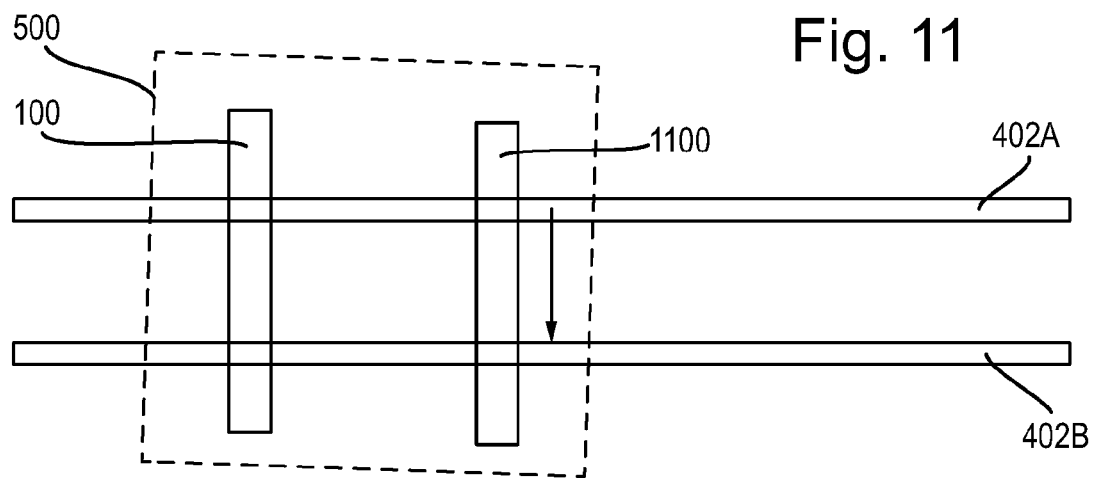
FIGS. 11, 12, 13 shows the same view as FIG. 7, illustrating a fourth mode of operation.
Figure 12:
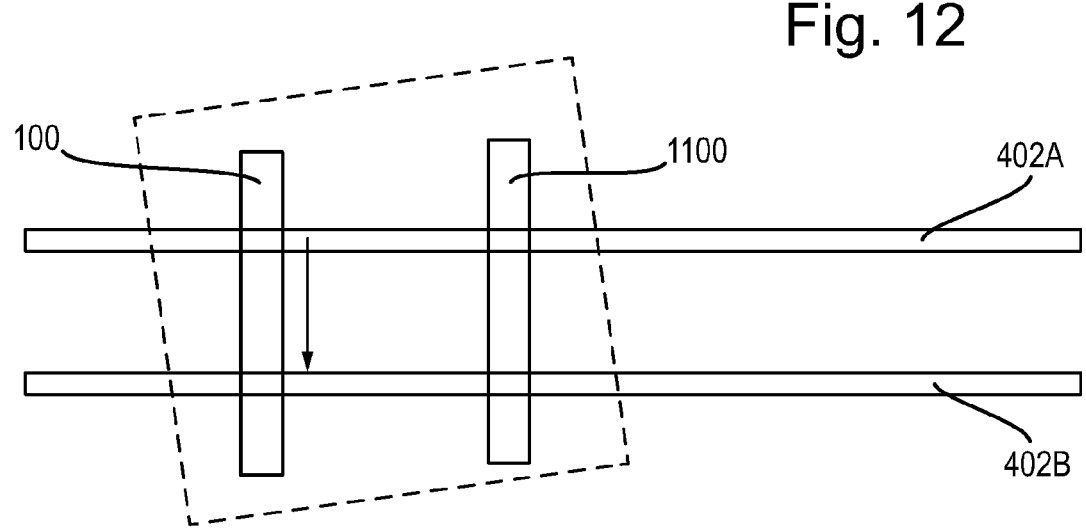
Figure 13:
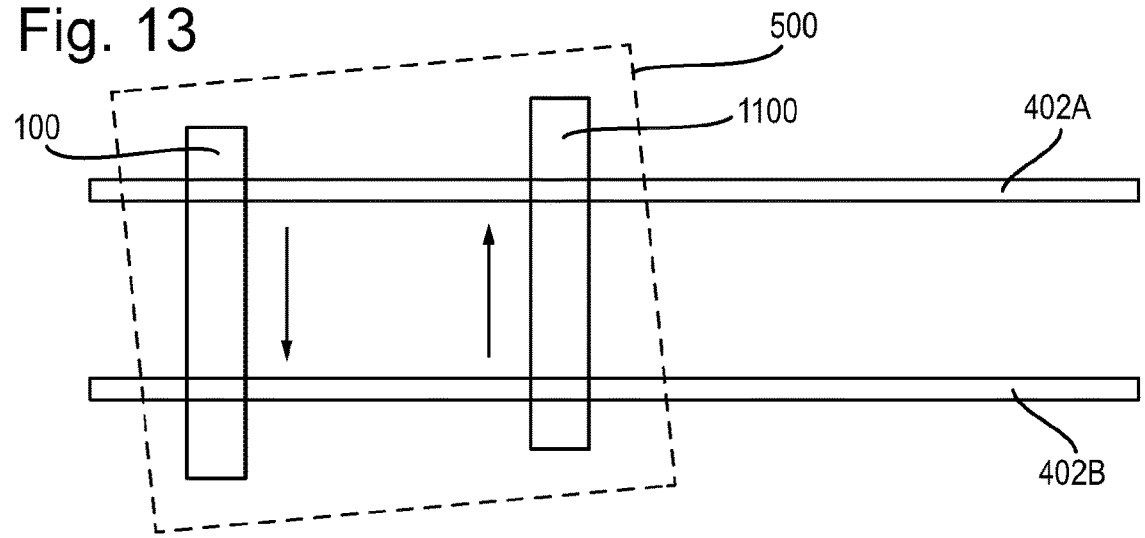

FIGS. 11, 12, 13 illustrate how the load 500 may be moved such that it is pivoted/rotated about the operational axes Y1, Y2, or about axes parallel to the operational axes Y1, Y2, relative to the support track system 400. That is to say, FIGS. 11, 12, 13 illustrate a further mode of operation in which alignment jig 10 is rotated/pivoted relative to the support track system 400 around an axis defined by, or parallel to one of operational axes Y1, Y2. In this mode of operation, the spacer members 430A1, 430A2, 430B1, 430B2 enable the jig 10 to move/slide relative to the track plates 420.

As shown in FIG. 11, the actuators of the first actuator unit 1120 and/or second actuator unit 1122 of the second base unit 1100 may be operated to move the second support unit 1200 relative to the second base unit 1100 while the actuators of the first base unit 100 are not operated, so that the load 500 may be angled relative to the operational axis Z1 of the track 400 (i.e. pivoted/rotated about the operational axes Y1, Y2, or pivoted/rotated about an axis relative to the operational axes Y1, Y2).

FIG. 12 illustrates a mode of operation in which the actuators of the first actuator unit 120 and/or second actuator unit 122 of the first base unit 100 may be operated to move the first support unit 200 relative to the first base unit 100 while the actuators of the second base unit 1100 are not operated, so that the load 500 may be angled relative to the operational axis Z1 of the track 400 (i.e. pivoted/rotated about the operational axes Y1, Y2, or pivoted/rotated about an axis relative to the operational axes Y1, Y2).

FIG. 13 illustrates a mode of operation in which the actuators of the first actuator unit 120 and/or second actuator unit 122 of the first base unit 100 and the actuators of the first actuator unit 1120 and/or second actuator unit 1122 of the second base unit 1100 may be operated together so that the load 500 may be angled relative to the operational axis Z1 of the track 400 (i.e. pivoted/rotated about the operational axes Y1, Y2, or pivoted/rotated about an axis relative to the operational axes Y1, Y2).

In the examples shown, the load 500 is shown twisted/pivoted in a certain direction, although equally a load 500 could be rotated in the opposite direction by a suitable operation of the actuators.

Figure 14:
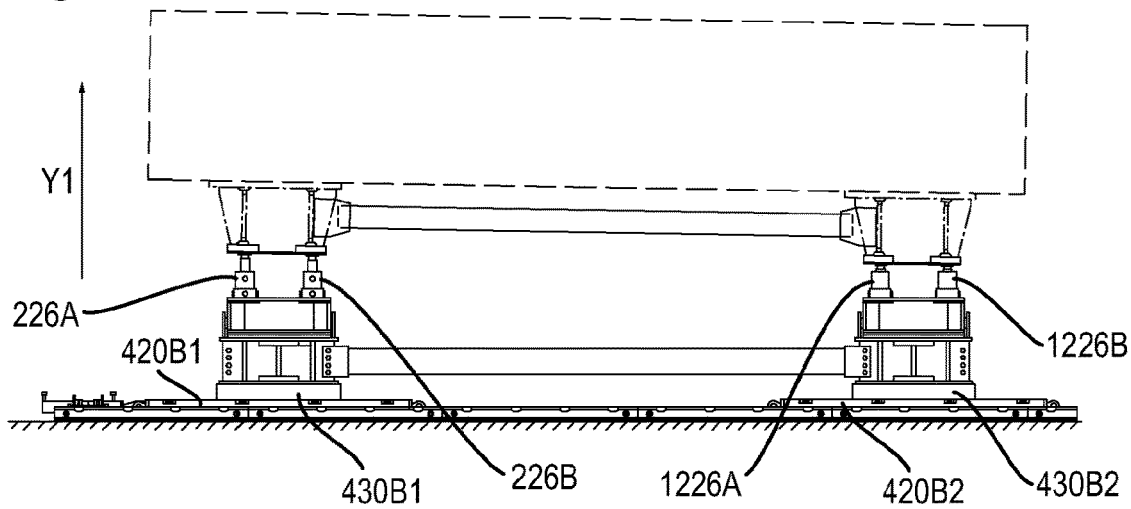
FIG. 14, 15 show the same view as FIG. 3, illustrating a fifth mode of operation.
Figure 15:
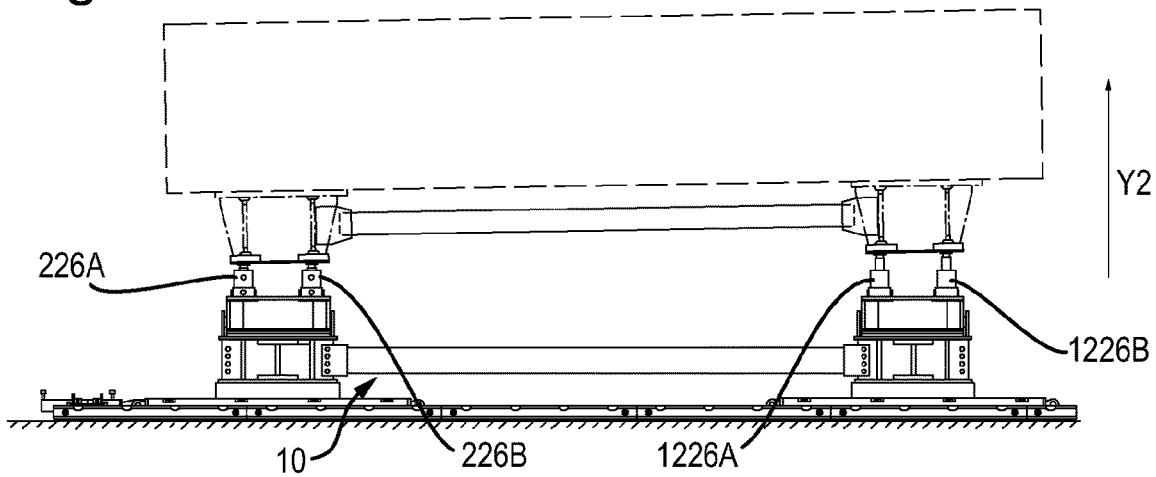

FIGS. 14, 15 illustrate how the actuators of the support units 200, 1200 may be operated to tilt the load 500 relative to the respective base units 100, 1100. For example, as shown in FIG. 14, the actuators 226A, 226B of the fourth actuator unit 222 may be operated to raise one side of the load 500, whereas the actuators 1226A, 1226B of the fourth actuator unit 1222 of the second support unit 1200 may not be operated, or may be extended to a lesser extent such that the load 500 can be tilted.

Conversely, as shown in FIG. 15, the actuators 1226A, 1226B may be extended more than the actuators 226A, 226B to tilt the load in an opposite direction. The same is true for the operation of actuators 224A, 224B and actuators 1224A, 1224B.

Figure 16:
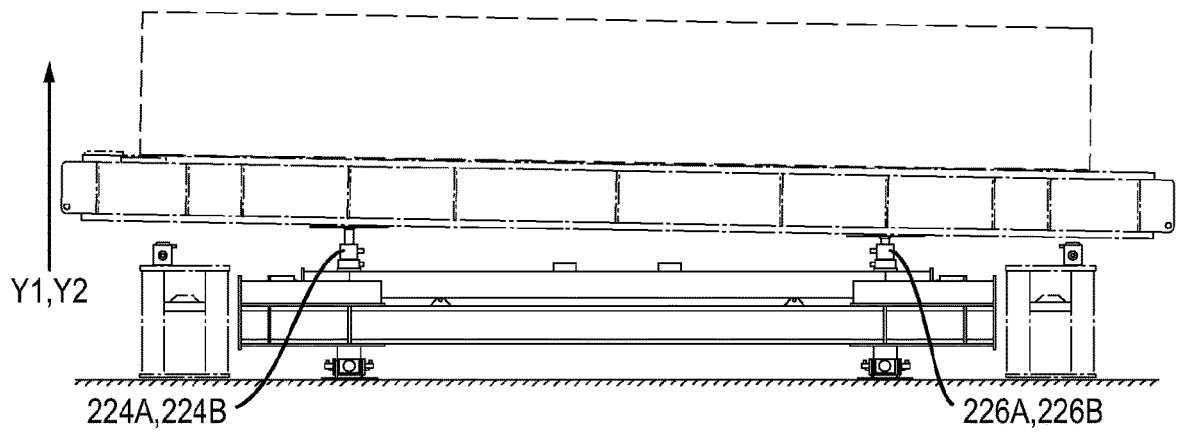
FIGS. 16, 17 shows the same view as FIG. 4, illustrating a sixth mode of operation.
Figure 17:
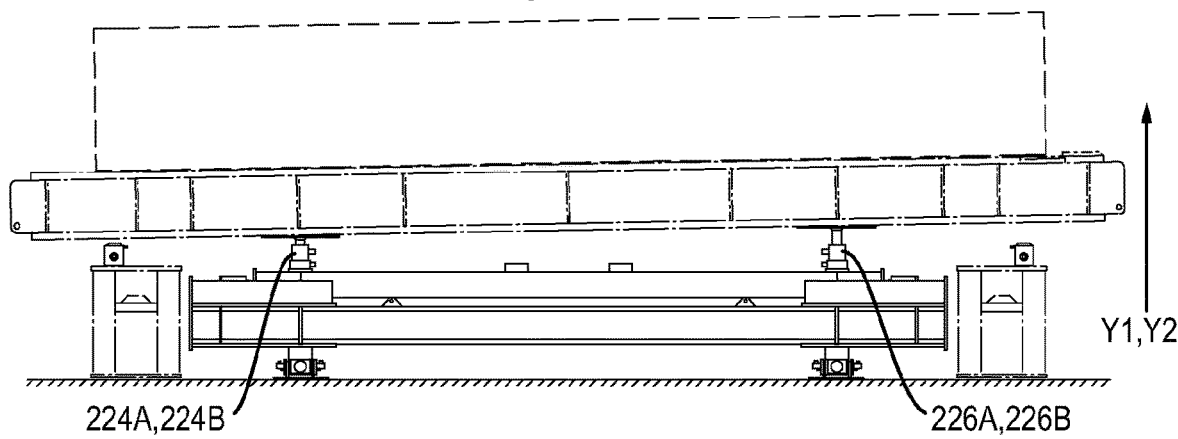

FIG. 16 illustrates a mode of operation in which the actuators 224A, 224B (and/or actuators 1224A, 1224B) of the third actuator unit of the first support unit 200 (and/or first support unit 1200) are operated to extend along the support unit operational axes Y1, Y2 to tilt the load 500 about an axis parallel to the operational axis Z1. FIG. 17 illustrates a mode of operation in which the actuators 226A, 226B of the fourth actuator unit of the first support unit 200 (hence also the actuators 1226A, 1226B of the fourth actuator unit of the second support unit 1200) may be extended to tilt the load in the opposite direction to that shown in FIG. 16 about an axis parallel to the operational axis Z1.

Figure 18A:
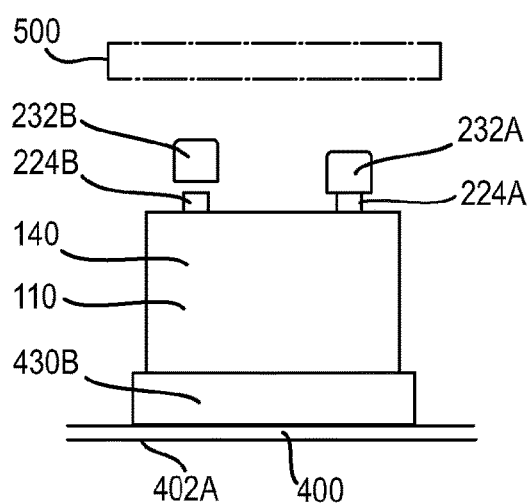
FIGS. 18*a*, 18*b* show an end sectional view of a part of the alignment jig before and after a load is applied.
Figure 18B:
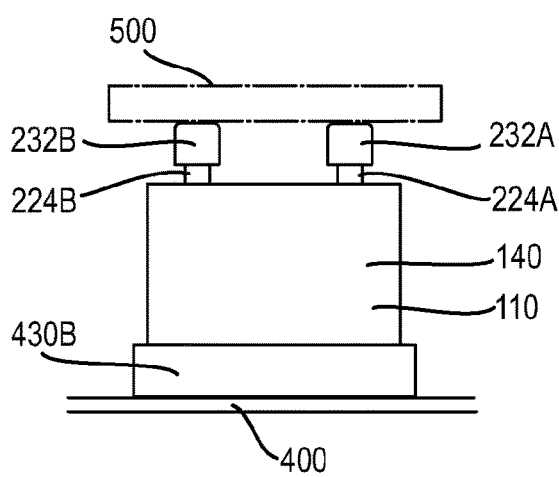

FIGS. 18a, 18b illustrates that the members 232A, 232B; 1232A, 1232B of the support units 200, 1200 respectively may move/pivot/flex relative to one another as the load 500 is applied to them. Hence as shown in FIG. 18a, before a load is applied, one of the members (for example 232B) may not be being supported (i.e. may not be in contact with) actuator 224B of the first support unit 200, whereas the other member 232A is in contact with actuator 224A of the first support unit 200. After the load 500 has been sat upon the actuators 224A, 224B of the first support unit 200, the members 232A, 232B pivot, flex and/or bend relative to one another until the members 232B and 232A both make contact with the actuators 224A, 224B of the first support unit 200. This "flex" allows for any tolerance/mis-alignment in the arrangement to be accommodated (i.e. so the support units may conform to the shape of the load 500) when the load 500 is placed upon the actuators of the support units.

Hence there is provided a jig and system which allow for orientation of a load/unit 500 and which seats and supports the load/unit during orientation thereby increasing the speed with which a load may be delivered, located and orientated in a correct relative position to another element so that a larger structure may be fabricated.

The alignment jig 10 which allows adjustment of position of a load 500 supported by the jig 10. When the jig 10 is used in conjunction with a track system 400 to create an alignment system 300, then the system as a whole is operational to also move in all required operational axes.

The system may be safely operated manually or by a control system. Thus heavy loads may be moved and orientated need of extra packing or adjustment according to methods of the art. The use of actuators, fixed relative to one another, rather than ad-hoc packing or adjustment systems means that movement of very heavy loads may be achieved in a controlled and safe manner.

A significant advantage of the alignment system of the present disclosure is that the track system may be laid upon any suitable substrate and then the alignment jig 10 may be placed upon the track. Hence there is no requirement for a specialised floor/substrate to be created with a bespoke rail system since the track 400 can be laid upon the substrate as required, and in the direction and location most suitable to the application, providing significant flexibility.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An alignment system comprising:
   an alignment jig configured to support and orient a load, the alignment jig including
   a base unit configured to carry a support unit, the support unit being configured to support the load and to space the base unit apart from the load, the support unit being moveable relative to the base unit, the base unit including a base unit actuation system operable to act on the support unit along a base unit operational axis X1, the support unit including a support unit actuation system operable to act on the load along a support unit operational axis Y1,
   wherein the base unit actuation system includes a first actuator unit spaced apart from a second actuator unit along the base unit operational axis X1, and the first actuator unit is fixed relative to the second actuator unit by a base unit support structure, and
   wherein the support unit actuation system includes a third actuator unit spaced apart from a fourth actuator unit along the base unit operational axis X1, and the third actuator unit is fixed relative to the fourth actuator unit by a support unit support structure;
   a support track system configured to support the alignment jig, wherein the alignment jig is moveable relative to the support track, and the support track system includes two track members spaced apart from one another by a distance D, wherein the base unit spans the track members, and each track member is provided with a track actuation unit operable to move the alignment jig relative to the track members; and a spacer member is provided between each track member and the alignment jig, the spacer member being configured to allow relative movement between the alignment jig and the respective track member.

2. The alignment system of claim 1, wherein the base unit is a first base unit, the support unit is a first support unit, the base unit actuation system is a first base unit actuation system, the base unit operational axis X2 is a first base unit operational axis X2, the support unit actuation system is a first support unit actuation system, the support unit operational axis Y2 is a first support unit operational axis Y2, and the alignment jig further comprises:
 a second base unit configured to carry a second support unit, the second support unit being configured to support the load and to space the second base unit apart from the load, the second support unit being moveable relative to the second base unit,
 the second base unit including a second base unit actuation system operable to act on the second support unit along a second base unit operational axis X2, and
 the second support unit includes a second support unit actuation system operable to act on the load along a second support unit operational axis Y2.

3. The alignment system of claim 2, wherein:
 the first support unit actuation system is operable independently of the second support unit actuation system, and
 the first base unit actuation system is operable independently of the second base unit actuation system.

4. The alignment system of claim 2, wherein the first base unit is spaced apart from the second base unit along an operational axis Z1, and wherein the operational axis Z1 is substantially perpendicular to the operational axes X1, X2 and to the operational axes Y1, Y2.

5. The alignment system of claim 2, wherein the first base unit is fixed relative to the second base unit by the base unit support structure.

6. The alignment system of claim 1, wherein the third actuator unit includes a pair of actuators which are spaced apart from one another along an operational axis Z1, and the fourth actuator unit includes a pair of actuators which are spaced apart from one another along the operational axis Z1, and wherein the operational axis Z1 is substantially perpendicular to the operational axes X1 and Y1.

7. The alignment system of claim 6, wherein each actuator of the actuator units are operable independently of the other actuators.

8. The alignment system of claim 6, wherein the support unit support structure comprises:
 a first member which extends between one of the actuators of the pair of actuators of the third actuator unit, and one of actuators of the pair of actuators of the fourth actuator unit; and
 a second member which extends between the other actuator of the pair of actuators of the third actuator unit, and the other actuator of the pair of actuators of the fourth actuator unit;
 wherein the first member and second member are spaced apart from one another along the operational axis Z1, and attached to one another at least at one point along their length such that they may move relative to one another.

9. The alignment system of claim 1, wherein each actuator unit may be controlled independently of the other actuator units.

10. An alignment jig, comprising:
 a base unit configured to carry a support unit, the support unit being configured to support a load and to space the base unit apart from the load, the support unit being moveable relative to the base unit, the base unit including a base unit actuation system operable to act on the support unit along a base unit operational axis X1, the support unit including a support unit actuation system operable to act on the load along a support unit operational axis Y1;
 wherein the base unit actuation system includes a first actuator unit spaced apart from a second actuator unit along the base unit operational axis X1, and the first actuator unit is fixed relative to the second actuator unit by a base unit support structure; and
 wherein the support unit actuation system includes a third actuator unit spaced apart from a fourth actuator unit along the base unit operational axis X1, and the third actuator unit is fixed relative to the fourth actuator unit by a support unit support structure;
 wherein the third actuator unit includes a pair of actuators which are spaced apart from one another along an operational axis Z1, and the fourth actuator unit includes a pair of actuators which are spaced apart from one another along the operational axis Z1, and wherein the operational axis Z1 is substantially perpendicular to the operational axes X1 and Y1;
 wherein the support unit support structure includes
  a first member which extends between one of the actuators of the pair of actuators of the third actuator unit, and one of actuators of the pair of actuators of the fourth actuator unit, and
  a second member which extends between the other actuator of the pair of actuators of the third actuator unit, and the other actuator of the pair of actuators of the fourth actuator unit,
  wherein the first member and second member are spaced apart from one another along the operational axis Z1, and attached to one another at least at one point along their length such that they may move relative to one another.

11. The alignment jig of claim 10, wherein the base unit is a first base unit, the support unit is a first support unit, the base unit actuation system is a first base unit actuation system, the base unit operational axis X2 is a first base unit operational axis X2, the support unit actuation system is a first support unit actuation system, the support unit operational axis Y2 is a first support unit operational axis Y2, and the alignment jig further comprises:
 a second base unit configured to carry a second support unit, the second support unit being configured to support the load and to space the second base unit apart from the load, the second support unit being moveable relative to the second base unit;
 the second base unit including a second base unit actuation system operable to act on the second support unit along a second base unit operational axis X2; and
 the second support unit includes a second support unit actuation system operable to act on the load along a second support unit operational axis Y2.

12. The alignment jig of claim 11, wherein:
 the first support unit actuation system is operable independently of the second support unit actuation system; and
 the first base unit actuation system is operable independently of the second base unit actuation system.

13. The alignment jig of claim 11, wherein the first base unit is spaced apart from the second base unit along an operational axis Z1, where the operational axis Z1 is substantially perpendicular to the operational axes X1, X2 and to the operational axes Y1, Y2.

14. The alignment jig of claim 11, wherein the first base unit is fixed relative to the second base unit by the base unit support structure.

15. The alignment jig of claim 10, wherein each actuator of the actuator units are operable independently of the other actuators.

16. The alignment jig of claim 10, wherein each actuator unit may be controlled independently of the other actuator units.

17. An alignment system, comprising:
- an alignment jig, including
  - a base unit configured to carry a support unit, the support unit being configured to support a load and to space the base unit apart from the load, the support unit being moveable relative to the base unit, the base unit including a base unit actuation system operable to act on the support unit along a base unit operational axis X1, the support unit including a support unit actuation system operable to act on the load along a support unit operational axis Y1,
  - wherein the base unit actuation system includes a first actuator unit spaced apart from a second actuator unit along the base unit operational axis X1, and the first actuator unit is fixed relative to the second actuator unit by a base unit support structure,
  - wherein the support unit actuation system includes a third actuator unit spaced apart from a fourth actuator unit along the base unit operational axis X1, and the third actuator unit is fixed relative to the fourth actuator unit by a support unit support structure, and
  - wherein the third actuator unit includes a pair of actuators which are spaced apart from one another along an operational axis Z1, and the fourth actuator unit includes a pair of actuators which are spaced apart from one another along the operational axis Z1, and wherein the operational axis Z1 is substantially perpendicular to the operational axes X1 and Y1;
- a support track system configured to support the alignment jig, wherein the alignment jig is moveable relative to the support track, and the support track system includes first and second track members spaced apart from one another by a distance D, wherein the base unit spans the first and second track members; and
- a track actuation unit operable to move the alignment jig relative to the first and second track members.

18. The alignment system of claim 17, further comprising:
- a first spacer member provided between the first track member and the alignment jig, the first spacer member configured to allow relative movement between the alignment jig and the first track member; and
- a second spacer member provided between the second track member and the alignment jig, the second spacer member configured to allow relative movement between the alignment jig and the second track member.

19. The alignment system of claim 17, wherein each actuator unit may be controlled independently of the other actuator units.

20. The alignment system of claim 17, wherein each actuator of the third and fourth actuator units are operable independently of the other actuators.

* * * * *